July 28, 1959     L. B. GRIFFITH     2,897,149
SEWAGE SCUM REMOVAL
Filed Sept. 29, 1954
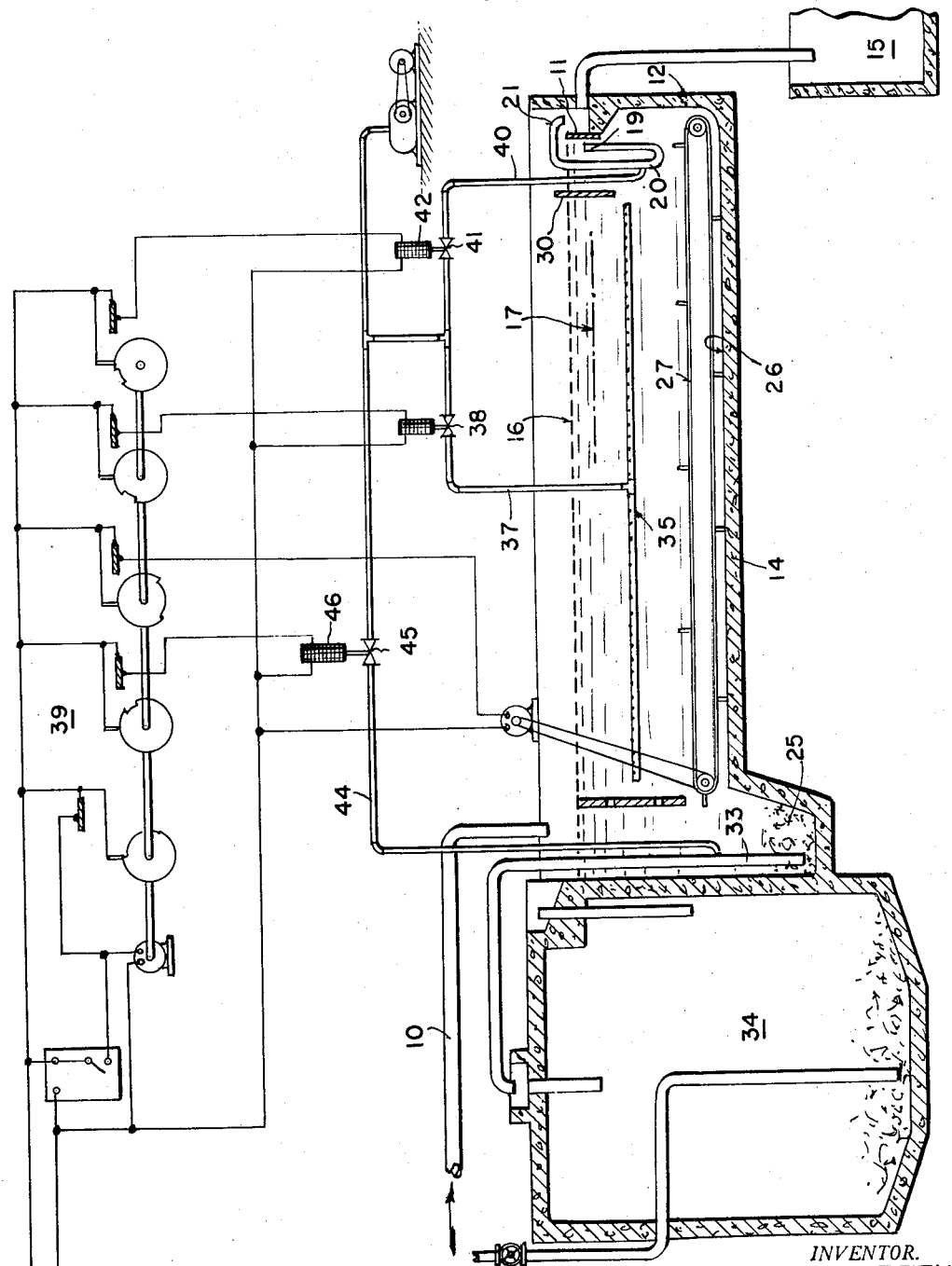
INVENTOR.
LLEWELLYN B. GRIFFITH
BY Henry H. Snelling
ATTORNEY

2,897,149
SEWAGE SCUM REMOVAL

Llewellyn B. Griffith, Arlington, Va.

Application September 29, 1954, Serial No. 459,185

3 Claims. (Cl. 210—48)

This invention relates to sewage treatment and has for its principal object the provision of means for removing scum from primary settling tanks without introducing large quantities of water into the sludge digester tank, with a consequent overflow of supernatant liquid from the digester back into the tank, this being very detrimental to the aerobic biochemical treatment in the plant.

An important object of the invention is to provide a method and an apparatus for violently agitating the scum layer at the top of a primary settling tank so that the carbon dioxide gas in the scum, formed in the mass of solids of the sewage and which causes the solids to rise to the liquid surface, will be broken loose from the scum solids which they make buoyant, so that, deprived of their supporting gases these solids will rapidly settle out which they would not do in absence of agitation.

A further object of the invention is the provision of a method of settling solids from the scum layer of a sewage tank, scraping the solids into a sump or sludge hopper and when the solids have time to settle in the sump, removing the sludge to the digester, the removing being timed to prevent excessive compaction of the heterogeneous solids such as feces, string, hair, rags, sand and the like resulting in a sticking of the sludge to the hopper walls; in other words, in less than an hour or two after completion of the cycle of sludge scraping into the hopper. A still further object of the invention is to provide a method and apparatus for lowering the liquid level in a primary settling tank without removing any of the scum layer and at a time of practically no flow into or from the tank, and as soon as the lowering of the liquid level is completed, blowing air from a large number of equally deeply immersed orifices vertically upward into the scum layer to violently agitate the water surface and free the scum of its gaseous supporting bubbles.

Such agitation of the sewage during heavy flow periods, without first lowering the liquid level, could never be tolerated as it would cause contamination of the effluent stream, or if discharged into a trickling filter these solids would clog the spray nozzles or overload the filter beds. When, however, the scum layer is agitated for a short period of time during the period of lowest sewage flow, for example for a minute at about four o'clock in the morning, a small amount of clear water may be pumped from the primary tank to the stream or to the filter without harmful effect and the scum solids may settle in the primary tank without interference to the normal operation. A very brief agitation of the scum layer at any time may be given without harm provided that the level of the top of the scum be first lowered preferably at the rate of about an inch per minute for say six minutes, agitation to be completed in about one minute, which would allow perhaps five minutes for completion of the cycle, that is before the settling tank begins to discharge again to the other parts of the system.

The figure is a somewhat diagrammatic vertical section through a primary settling tank of a sewage system.

Sewage enters the tank 14 as at 10 and discharges over the weir 11 in the wall 12 which separates the primary settling tank 14 from the secondary tank 15. The normal liquid level 16 is determined by the weir 11 while the lowered liquid level 17 denoted by a dot and dash line is determined by the elevation of the entry end 19 of the air lift pipe 20 discharging at its rear end 21 into tank 15. A sump or sludge hopper 25 at the entry end of the tank 14 receives settled solids scraped from the tank bottom 26 by any well known mechanism as, for example, the chain scraper 27 shown in part only.

A scum baffle 30, near the exit end of the tank extends above the normal liquid level and well below the lowered or depressed level 17 to prevent scum from being drawn off by operation of the air lift 20 which as far as possible should deliver only clear liquid. Between the air lift 33 which discharges from the primary settling tank 14 into the digester 34 and the scum baffle 30 is a horizontal air pipe 35 about one inch in internal diameter and having spaced holes perhaps 6" apart of gradually increasing diameter to a maximum at the ends of about a quarter of an inch so as to provide uniform discharge of air upward to the scum layer. This pipe is supplied by piping 37 from the main air supply and the time of supply and the rate thereof is controlled by a valve 38 operated by timing mechanism 39. A branch pipe 40 leads to the air lift 20 and is controlled by a valve 41 controlled by a solenoid 42 operated by the cycle timer 39, the design of which is well known and includes a series of cams whereby solenoid 42 is energized to open and close valve 41, whereupon a further cam of the usual cycle timer will cause the opening and closing of valve 38 through the usual microswitches.

The chain scraper 27 is operated in accordance with usual practice and should be timed so that the scraper operates after the solids have had considerable opportunity to sink to the bottom after the scum layer is broken up. The air supply through pipe 44 to air lift 33 may be controlled by hand but if controlled automatically as by the valve 45, timed by solenoid 46, the timing should be set so that the air lift 33 cleans out the sump 25 within a reasonably short period of time after the scraper has thrown the solids into the sump. I prefer a period of about an hour as I find that the solids become difficult to remove if the period between operation of the scraper and operation of the air lift 33 approximates a period as great as three hours.

The operation is as follows: At a suitable time of low sewage flow, for example, a time between three and five o'clock in the morning, the time clock will first open valve 41 and air lift 20 will then pump clear water from the primary into the stream or to the trickling filter or elsewhere, operating for six minutes which at the normal rate of flow would lower the liquid level from line 16 to line 17 a distance of about 6". Immediately after closure of valve 41, the time clock opens valve 38 which feeds air into the perforated air pipe 35 causing a violent agitation of the scum for a period ranging from 15 seconds to five minutes, 60 seconds being the preferable time and providing five full minutes of the cycle to permit the solids to settle. The scraper may one hour later, that is before sufficient carbon dioxide gas is again produced from the settled organic matter, operate to discharge the solids into the sump 25 and preferably when the solids have had ample time to settle at the bottom of sump 25 the air valve 45 is opened and this sludge is removed to the digester.

What I claim is:

1. The method of removing scum from a primary settling sewage tank in a manner to decrease the ratio of water to sludge solids in the material transferred from the tank to a digester; which method consists in lowering the level of the liquid surface in the primary tank by removing from the tank a quantity of clear liquid, immediately thereafter breaking up the scum floating in the tank at the lowered level by violent agitation to release carbon dioxide gas from the scum made buoyant thereby, so the solids of the scum will fall to the bottom of the tank, such lowering of the liquid level permitting the completion of the step of violent agitation without the passing of material from the primary settling tank, then collecting the settled sludge solids, and finally transferring the collected sludge solids to the digester in a period not exceeding two hours after collection of the sludge to avoid sticking of the solids to the wall of the tank.

2. A sewage tank having a scum baffle near the exit end of the tank, a sump below the major portion of the bottom of the tank, a weir for determining the normal liquid level in the tank, means for scraping solids settling on the bottom of the tank into the sump, piping for transferring collected sludge from the sump to a digester, means for discharging air between the bottom of the tank and the scum layer to violently agitate the scum layer, and means located adjacent the weir for lowering said normal liquid level in the tank by a chosen amount, said last named means including a level-lowering pipe having its entry end between the exit end of the tank and the scum baffle and at the height of the chosen lowered level, whereby when the lowering is done at a period of minimum flow into the tank the liquid passing through the level-lowering pipe will be substantially pure water.

3. In combination, a primary settling tank having a flat bottom leading to a sludge sump, a weir at the exit end of the tank for determining the normal liquid level in the tank, a scum baffle proximate the weir, an air lift between the weir and the scum baffle, said air lift having its entry end below the normal liquid level in the tank as determined by said weir so that the air lift determines a lower liquid level in the tank when the air lift is operated, said air lift having its discharge end beyond the weir, means for violently agitating the scum-covered liquid in the tank when the liquid level is lowered by the air lift, means for intermittently scraping solids from the bottom of the tank and into the sludge sump, air-lift means for transferring sludge from the sump to a digester, and time-controlled means for operating in sequence, the level-lowering air lift, the agitating means, the scraping means, and the air lift transferring sludge to the digester.

References Cited in the file of this patent

UNITED STATES PATENTS

| | | |
|---|---|---|
| 1,722,945 | Pruss | July 20, 1929 |
| 1,838,475 | Buswell | Dec. 29, 1931 |
| 2,086,730 | Miik | July 13, 1937 |
| 2,110,721 | Fischer | Mar. 8, 1938 |
| 2,254,176 | Fischer | Aug. 26, 1941 |
| 2,435,366 | Riche | Feb. 3, 1948 |
| 2,616,848 | Griffith | Nov. 4, 1952 |
| 2,628,190 | Langdon | Feb. 10, 1953 |
| 2,638,444 | Kappe | May 12, 1953 |
| 2,640,027 | McNamee | May 26, 1953 |